UNITED STATES PATENT OFFICE.

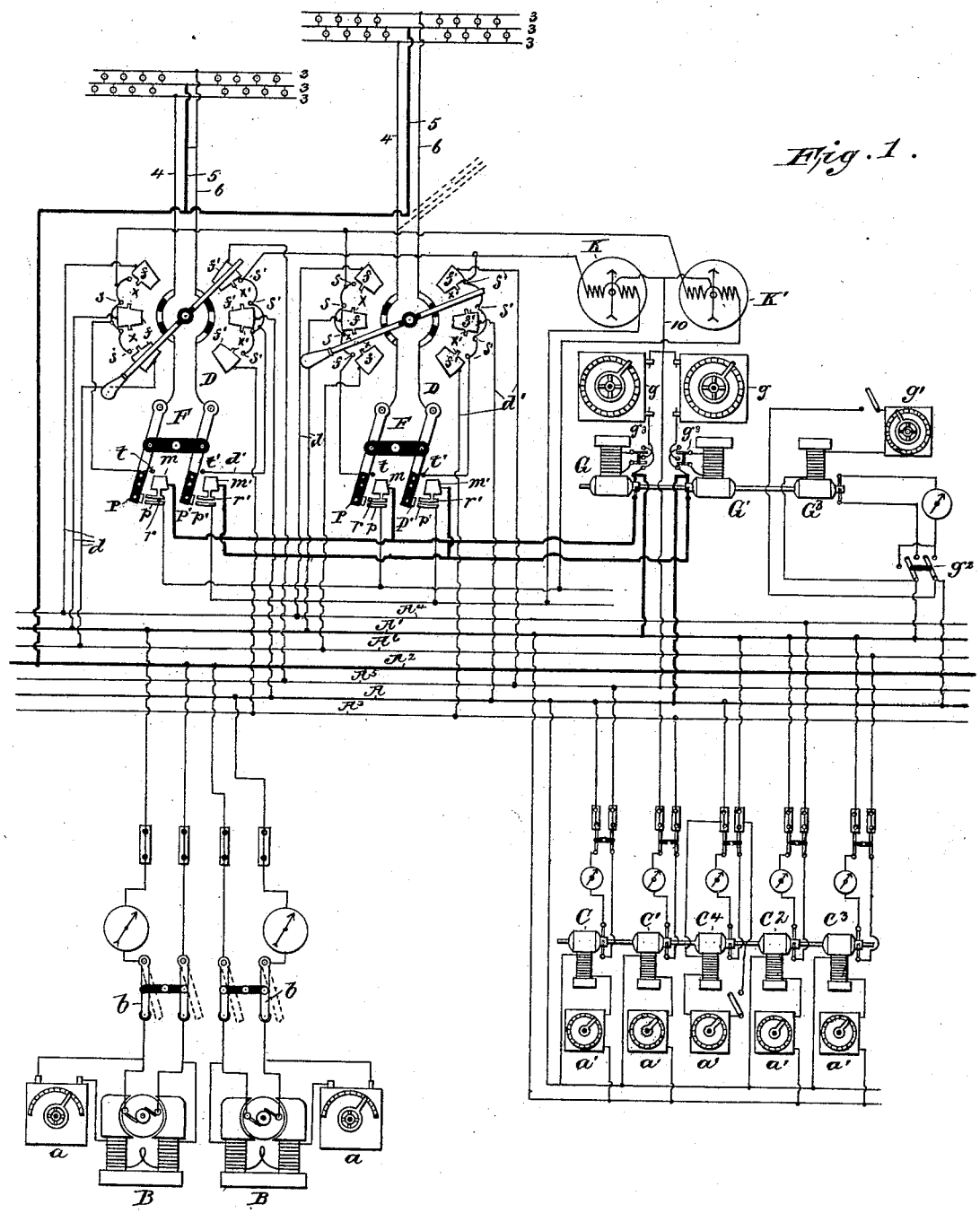

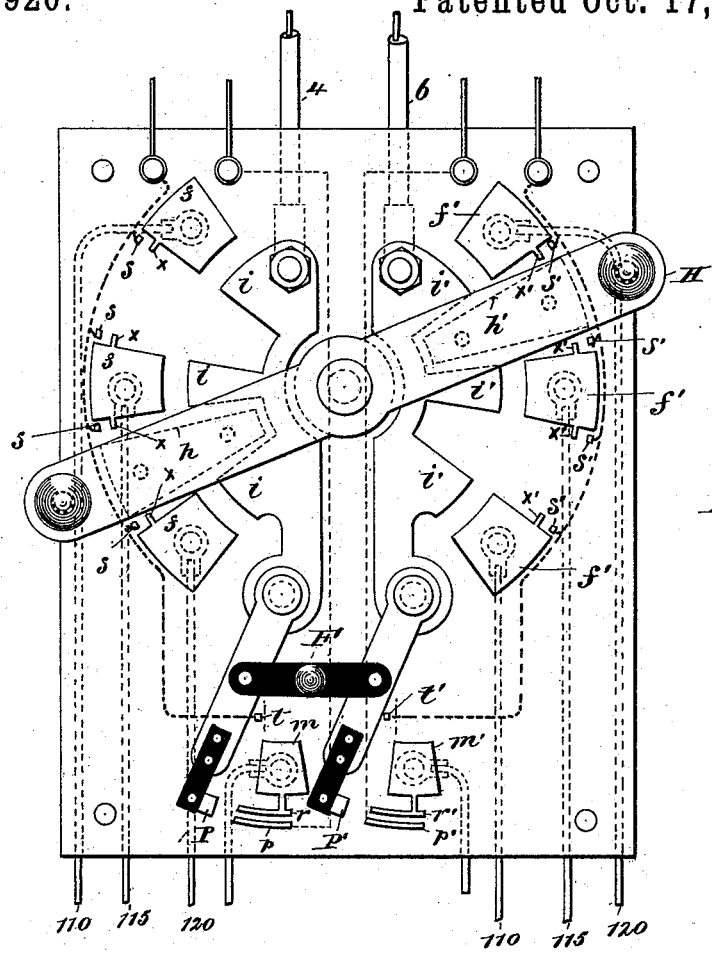

CYPRIEN O. MAILLOUX, OF NEW YORK, AND WILLIAM S. BARSTOW, OF BROOKLYN, NEW YORK.

ELECTRICAL SYSTEM OF DISTRIBUTION.

SPECIFICATION forming part of Letters Patent No. 506,920, dated October 17, 1893.

Application filed April 27, 1893. Serial No. 472,033. (No model.)

*To all whom it may concern:*

Be it known that we, CYPRIEN O. MAILLOUX, residing at New York, in the county of New York, and WILLIAM S. BARSTOW, residing at Brooklyn, in the county of Kings, State of New York, have invented a certain new and useful System of Electric Distribution, of which the following is a specification.

Our invention relates to those systems of electric distribution known as constant potential systems, so called because the potential difference in the consumption circuits or mains is maintained constant independently of the load which they carry or their distance from the source of supply or generating station. It is customary in practice to maintain these consumption circuits of the required value and constancy of potential difference by means of so called feeder circuits conveying electrical energy from the generating station and delivering it to the mains at various points. Inasmuch as these feeder circuits are not all of equal lengths or do not carry equal loads, it is found necessary to so proportion their conductivity, by varying their sectional area, that the loss or drop of potential at full normal load, will be equal or nearly so in all the feeders. It is found, however, that all the feeders are not necessarily fully loaded or unloaded at the same time owing to the location of the mains they supply. Thus, for example, in wholesale and office districts the greatest load is carried on the feeders in the day time while in residence districts, the greatest load is reached in the evening. Under such conditions the potential of the generators at the station cannot be raised to suit the loaded feeders, without becoming excessive for the feeders supplying mains which are only partially loaded. For this reason it has been found almost indispensable to interpose variable artificial resistance or "feeder equalizers" in the feeder circuits whereby the drop or fall of the potential in the partly loaded feeders is artificially increased and regulated so as to maintain a constant potential at the mains. It is obvious that the energy consumed in heating this artificial resistance is wasted.

The principal object of our invention is to obviate any loss of electrical energy in the feeders, beyond the intrinsic loss due to their own resistance.

Another object of our invention is to provide means whereby different potentials can be successfully employed in the supply or generating station to suit the varying conditions of loss or drop in the feeders due to their distance and the load they carry, and to provide means whereby the feeders can be readily and expeditiously transferred from one potential to a higher or lower one without affecting the rest of the system or without interrupting or disturbing the service at the mains supplied by said feeders.

Our present invention consists broadly in the use of distinct graded potentials, however, produced, for the several feeder circuits or sets of circuits, each potential being adapted to a different condition of feeder load or length, with suitable switches for shifting the feeders from one potential to another as occasion may require, in combination with a source of regulable electro-motive force adapted to be connected and disconnected from the feeder terminals and employed to artificially and temporarily vary the potential of a feeder terminal as an accessory step to the switching operation. The different graded potentials may be produced either by distinct machines or banks of machines supplying different bus-bars; or they are derived from the same initial potential by employing supplemental electro-motive forces to raise or lower the initial potential, or the two ways may be combined, and one of the features of our invention consists in such combination.

Our invention consists also in the improved combination of apparatus for supplying the different graded potentials, according to the load at the station, and consists in the combination with the several bus-bars of graded potential, of supplemental electro-motive force generators operating in connection with a source or sources of uniform initial potential for the purpose of raising or lowering the said initial potential so as to produce said graded potentials, and main generators of different adjustable or primary potential capacity which may be used alone to supply the graded potentials to the bus-bars directly when the station load may make such use an economical one.

Our invention consists further in an improved means for switching the feeder from a source of one potential to a source of different potential by artificially bringing the terminal of said feeder to the potential of the source to which it is to be shifted and then shifting to such source.

Our invention consists further in the special combinations of apparatus as hereinafter more particularly described and then specified in the claims.

In carrying out our invention we may use any source of regulable electro-motive force in the switching operation for the purpose of artificially changing the potential of the feeder terminal, as hereinafter described, and in conjunction with such source suitable switch devices whereby the said source may be connected to the feeders and disconnected therefrom at pleasure. We prefer, however, in the practice of our invention to employ for the regulable electro-motive force generator an armature which is used to vary the potential derived from the main generator or portion of the generator system by attachment to a bus-bar or otherwise. This supplemental electro-motive force generator may, by suitable appliances, be employed to either aid or oppose the potential of the bus-bar to which it is attached so that by connecting it for example to a bus-bar of an intermediate potential, it may serve to either raise said intermediate potential to the highest of the graded potentials or to cut it down to the lowest.

The switch system employed will for convenience be treated as comprising two parts, one of which we denominate the feeder switch whereby the feeder may be connected to the different graded potentials, while the other part we denominate the "booster switch" as it serves to connect the supplemental generator to the feeders. This supplemental generator we have herein shown as consisting of an electro-dynamic armature whose power is regulated by any suitable means known in the art, and which may be revolved by any suitable motive power.

In connection with the apparatus we use suitable measuring instruments, whereby the potential at the terminal of the booster switch where it is connected to the feeder, may be compared with the feeder terminal before connection is made between the booster and the feeder terminal. We also propose to use suitable means for comparing the potential of a feeder terminal as modified by the booster with the potential of the bus-bar switch terminal to which the feeder is to be transferred.

One feature of our invention consists in the combination with the feeders and the booster, of a suitable differential measuring instrument, and suitable switch devices whereby two sides thereof may be connected respectively to a booster terminal and to a feeder terminal of any of the feeders.

When in the operation of the central station it becomes desirable to change the feeder from a bus-bar of one potential to the bus-bar of another, it is obvious that if the feeder terminal be at a different potential from that terminal of the switch which connects with the bus-bar to which the feeder is to be transferred, there will be a tendency to sparking on transfer and an interruption or else a disturbance of the load carried on the feeder and of the general operation of the station; but if the transfer can be made with a condition of potentials such that the feeder terminal shall have a potential the same as the source to which it is to be shifted, then the switching may take place without disturbance.

In the operation of switching the regulable source is used in the following manner—when a feeder is to be transferred from one bus-bar to the other:—If at the time a change is to be made, the potential of the feeder terminal be the same as the potential of the bus-bar to which the supplemental generator is connected and said generator be not running, it will be obvious that the free terminal pole of said supplemental generator can be at the same time connected with such feeder by the switch. In this condition it will be obvious that the feeder will receive current through the two paths, one through the feeder switch, the other through the supplemental generator and a booster switch; and under such conditions the feeder switch may be opened to disconnect the feeder from the source of potential from which it is to be transferred without disturbing either the load carried on said feeder or the operation of the station. The supplemental machine or booster may be now run and its electro-motive force caused to gradually vary in one direction or the other according to whether it is necessary to raise or lower the potential of the feeder terminal in order to bring the potential of said feeder terminal to that of the bus-bar to which it is desired to transfer said feeder. When this point has been reached, it is obvious that in like manner the feeder may be switched to the different potential, after which the supplemental generator may be disconnected leaving the feeder connected with the desired bus-bar. If when the transfer is to be made the feeder be at a different potential from the free terminal of the supplemental armature or regulable generator, the electro-motive force of the latter will be varied to add to or subtract from the potential so as to bring the potential of the booster switch terminal to that of the feeder terminal. The booster switch can then be closed as before upon the feeder terminal as before described, after which the regulable generator of electro-motive force can be varied to bring the feeder terminal potential up or down to the potential of the bus-bar to which it is to be transferred, and the operation completed as before.

Before connecting the feeder to the booster switch, the potentials of the feeder terminal and the booster terminal should be compared; for which purpose suitable electrical measuring instruments may be provided. This comparison we prefer to make through the operation of a differential measuring instrument, the pointer of which by standing at zero indicates identity of potential at the feeder terminal and at the terminal of the booster switch. The same comparison may be made in the same way between the potential of the feeder terminal and booster switch while connected together and the potential of the switch terminal of the bus-bar or potential source to which the transfer is to be made.

Briefly speaking the plan of operation in switching a feeder from the source of one potential to another according to our invention, involves first, connecting said feeder to a regulable source whose potential at the feeder terminal is by suitable means made the same as that of the source from which it is to be transferred, then disconnecting the latter source and gradually varying the regulable source until the potential of the feeder terminal is changed to that of the source to which it is to be shifted, then switching to the latter and finally removing the regulable source. In this way it is possible to transfer a loaded feeder from one source of energy to another, of a different potential greater or less without interfering with the load and without sparking or other objectionable effect at the switch.

Other features and combinations forming our invention will be specified in the claims at the end of this description.

In the accompanying drawings:—Figure 1, is a diagram of an apparatus by which our invention may be practiced. Fig. 2, is an enlarged detail plan of a form of switch apparatus that may be employed. Fig. 3, is a diagram illustrating that part of our invention which relates to combinations of main generators and auxiliary generators for providing the desired bus-bar potentials under different conditions of station working.

In the diagram we have shown our invention as applied to a three wire system each side of which is shown as practically a duplicate of the other in respect to switch contacts, measuring instruments, bus-bars, supplemental variable generators, &c., but as will be readily understood by electricians the invention may be applied to other systems as, for instance, to four or five wire systems, or to systems in which no neutral or third wire is employed.

A description of the operation with reference to one side of the three wire system will be sufficient.

$A$, $A'$, are positive and negative bus-bars, and $A^2$, the neutral bus-bar of a three wire system, and form terminals of any desired potential fed from suitable generators as well understood in the art. The potential assumed in the present case is one hundred and fifteen volts, but might be greater or less. The main source of such potential is here indicated as consisting of dynamo generators $B$, $B$, or banks of generators with the usual accompaniment of field regulators $a$, $a$, for adjusting the potential; switches $b$, $b$, between the dynamos and the bus-bars, voltmeters, galvanometers, and fuses, &c.

Any number of generators may be used suitably connected as shown, and suitable switches may be provided for connecting and disconnecting them from the bus-bars $A$, $A'$, $A^2$, or from the other bus-bars of the systems. Said main generators are preferably provided of different regulable or primary potential capacity so that by suitable connection of them to the bus-bars $A$, $A'$, $A^2$, and the remaining bus-bars, as will be fully hereinafter described, different or graded potentials may be furnished at the bus-bar board direct without the intervention of the supplemental or auxiliary electro-motive force generators to be presently described; and said main generators may be coupled singly or in multiple to the bus-bars.

$A^3$, $A^4$, indicate auxiliary bus-bars of a lower potential say one hundred and ten volts, and $A^5$, $A^6$, auxiliary bus-bars of a higher potential, say one hundred and twenty volts, secured by the intervention of the supplemental or auxiliary electro-motive force generators $C$, $C'$, $C^2$, $C^3$, applied to raise or lower the potential of the main source to the desired amount and which are of comparatively small capacity. For this purpose some may be run as motors to develop counter electro-motive force, and others as generators to positively supplement the potential; their armatures may be connected as shown between the bus-bars $A$, $A'$, of standard or intermediate potential, and the auxiliary bus-bars of higher and lower potential. Thus the armatures of $C$, and $C^3$, run as assisting generators, are connected between $A$, $A'$, the one hundred and fifteen volt bus-bars and the one hundred and twenty volt bus-bars so as to raise the potential, while $C'$ and $C^2$, are run as motors so as, by their counter electro-motive force, to cut down the potential, and are connected between the one hundred and fifteen volt and the one hundred and ten volt bars. Instead of running some as motors and some as generators all might be run as motors or all as generators. As will be seen each auxiliary generator as, for instance, generator $C$, being connected at one terminal to a bus-bar $A^5$, and at its other terminal to the bus-bar $A$, to which one or more main generators are or may be connected, is run in a connection between the bus-bar $A^5$, and the main generator or generators and serves to raise or lower the bus-bar potential above that which it would be if the main generator were connected direct to it, in which case, as will be obvious, the auxiliary bus-bars would be run all at a potential above or all at a potential below the bar to which the main generator or generators are connected directly. The said motor and dynamo armatures of the supplemental or auxiliary generators may be coupled together in any desired way so that the electro-motive force expended as power in the motors may be utilized in the generators, or in the driving power of any part of the system.

For simplicity the armatures may be all mounted on the same shaft and a motive power applied by means of an electric motor $C^4$, run from the standard or other bus-bars, as shown, so that the excess of power in the counter electro-motive force motors will be returned to the general system as electro-motive force in a manner well understood in the art. The said supplemental armatures might be run by belt or other mechanical connections with the driving power of the station with the same advantage.

The supplemental armatures are provided as shown with suitable galvanometers and switches for throwing them into and out of circuit, and their field magnets are energized in any suitable way, but conveniently from the station bus-bars as shown.

Suitable field regulators $a'$, are provided for adjusting the electro-motive force of the armatures as required to maintain or vary the bus-bar potentials as described. In this system such variations and adjustments of potential can obviously be made without adjustment of the main station dynamos. It will of course be understood that the armatures of the machines C, C', $C^2$, $C^3$, are specially wound with relation to the maximum current which it may be desired to take off the bus-bars, $A^3$, $A^4$, $A^5$, $A^6$, through such machines.

Feeder wires supplying mains 3, 3, are indicated by the numerals 4, 5, 6, of which 5, is the central or neutral feeder and 4, 6, the outside or exterior positive and negative feeders. As will be readily understood each feeder is representative of a set of feeders as indicated by the dotted lines. The feeders are shown in two systems each connected to its own switch D, D. Although but two systems and two switches are shown, it will be understood that the number may be indefinitely increased, the connections being all similar.

Each switch D, is constructed to operate on the feeders 4, 6, for the two sides of the system at once, and to transfer said feeders from any bus-bar to any other at pleasure through connections $d$, $d'$, running from the bus-bars to the contacts $f$, $f'$, of the switch, as clearly shown in the diagram, $d$, $f$, being the connections and contacts for one side of the three wire system and $d'$, $f'$, those for the other side. The switch may be actually constructed as shown in Fig. 2. The switch lever or bar H, of insulating material carries the two metal segments $h$, $h'$, as clearly shown in the detail view by the dotted lines, which segments are adapted to bridge the spaces between the contacts $f$, $f'$, and the feeder terminals $i$, $i'$, to which the feeders are directly connected as shown. These segments or contacts $i$, $i'$, are preferably formed on a single plate cut away as shown to form blank spaces over which the movable segments $h$, $h'$, may rest in the position shown in the detail plan. It will be obvious that this construction furnishes a means whereby the feeder terminals may be switched into and out of connection with the several bus-bars at pleasure the connection of both sides of the system being controlled in one and the same operation.

F, indicates what we term a booster switch inasmuch as it controls the connection of the regulable source of electro-motive force with the feeder terminals in the operation of switching. This switch operates upon both sides of the system being provided as shown with the double switch arms in connection respectively with the plates $i$, $i'$. The switch levers are adapted to engage the contacts $m$, $m'$, which being connected directly with the poles of the boosters constitute booster terminals.

The supplemental electro-motive force generators are typified at G, G', (Fig. 1,) as consisting of dynamo electric machines and provided with suitable means for varying or adjusting their potential or electro-motive force capacities, such devices being here shown as consisting of the regulable resistance boxes $g$, connected into the field circuits of said machines. The armature of said machines are connected as shown to the standard bus-bars, A, A', at one terminal, their free terminals being joined with the contacts $m$, $m'$. If both run as generators it is obvious that they will raise the potential of the contacts $m$, $m'$, or of the feeder terminals when connected to the said contacts, and that by operating the regulating devices the potential at the feeder terminals when connected through the booster switch may be adjusted as described. It will be obvious that these supplemental generators might be connected to the bus-bar of lowest potential and always operate to raise the potential at the booster switch but by connecting them to an intermediate potential and by providing suitable devices for reversing the action of said supplemental generators they may be used to either lower or raise the potential at the booster switch by operating to assist or oppose the potential of said intermediate bus-bar. If connected to the bus-bar of highest potential it is obvious that they would always have to be run to oppose such potential. Being connected, in the manner, shown, to the intermediate potentials, we provide suitable means for reversing the motions of the armatures or for reversing the field or for otherwise reversing their action as may be desired so that they may cut down the one hundred and fifteen volts potential in the direction of one hundred and ten volts or raise it to the one hundred and twenty volts.

In the drawings, Fig. 1, the armatures are shown as driven by an electric motor $G^3$, which is connected to a bus-bar of the system or is otherwise supplied with electric energy and which may have its speed and power governed by a suitable resistance box $g'$, or other controller. A reversing switch $g^2$, may serve to reverse the motor. Instead of reversing the motor, the fields of the machines G, G', might be reversed by means of switches $g^3$, as indicated, to produce the same effect.

K, K', indicate suitable differential measuring instruments for the two sides of the system respectively. These instruments are designed to measure or compare the potentials of a feeder terminal and a booster terminal and to allow the booster terminal potential to be adjusted to conform to that of the feeder terminal before the booster is connected thereto. They also serve as a means for comparing the potential of the bus-bar terminal $f$ or $f'$, with that of the feeder and booster terminal when the two latter are connected as will be presently described. From one side of each of these differential instruments connections are carried as shown to the contacts $p, p'$, placed in propinquity to contacts $r, r'$, which latter are in connection with the booster terminals by attachment to the contacts $m, m'$. Switch contacts P, P', serve to connect at pleasure the contacts $p, r$, and $p', r'$. The contacts P, P', are preferably mounted on the levers of the switches F, but insulated therefrom, as shown, and the contacts with which they engage are so arranged that connection may be made with the measuring instruments without connecting the feeder terminals with the boosters. As will be seen the first movement of the levers of switches F, will make the connection between the boosters at one side of their differential measuring instruments, while the continuance of the movement will connect the feeder terminals and the booster terminals by the contacts $m, m'$. The other sides of the differential receiving instruments are connected with contacts $s$, and $s'$, and also with contacts $t$ and $t'$. The latter contacts serve as switch contacts for connecting the feeder terminals to the measuring instruments, they being for such purpose in position to be engaged by the lever arms of switches F, when the latter are turnd to connect the boosters to the instruments K, K'. The contacts $s, s'$, operate in conjunction with contacts $x, x'$, and the segments $h, h'$, as switch apparatus for placing one side of the differential receiving instruments in connection with bus-bars corresponding to the several bus-bar segments $f, f'$, of the feeders witch. As will be seen the arrangements are such that the lever H, may take the position of disconnection without bridging contact segments $i, f$, or $i', f'$. The differential instruments K, K', connect by wire 10, with the neutral bus-bar A, or with other point which will permit the potentials to be measured as hereinafter described.

The general operation of the apparatus in making the transfer of a feeder or feeders from a source of one potential as the bus bar to a source of another potential, as another bus-bar, would be as follows:—Switch F, is first partially turned thus connecting the booster and the said feeder or feeders with the measuring instruments by the contacts $t, r$, and the booster or supplemental generator is run and regulated until the differential receiving instrument indicates the same potential of feeder terminal and booster terminal. When this condition is attained it is obvious that the switch may be turned to connect the booster terminal direct to the feeder terminal by the contact $m$, or $m'$, without disturbance. The feeder now receives current through two paths, one direct through the feeder switch and the other through the supplemental armature, and the feeder switch arm H, may now obviously be turned to open circuit at a contact $f$, or $f'$, without disturbing either the load carried on said feeder or the operation of the station. The switch H, is now brought to position to connect the contact $x$, or $x'$, corresponding to the feeder switch contact and bus-bar to which the feeder is to be shifted, but said feeder still remains out of connection with the said bus-bar to which it is to be shifted. By switch contacts $x, s$, the measuring instrument is connected with a bus-bar and the potential thereof may obviously be compared with that of the feeder terminal and booster terminal which are connected together by the switch F. The booster or supplemental generator is now regulated until the measuring instrument indicates that the feeder terminal has been brought to the potential of the contact $f$, or $f'$, to which it is to be shifted. The feeder switch is then closed on the contact corresponding to said potential which may obviously be done under such circumstances without detriment or disturbance. The feeder is now receiving current through two paths one from a bus-bar through the booster and the other direct from another bus-bar. Under this condition it is obvious that the booster switch may be now opened leaving the feeder connected with the bus-bar to which it is to be transferred, the operation being thereby completed.

It will be understood that in the movement of the switch F, to connect the free terminal of the booster with the feeder the contact lever will have moved fully over the contact $t$ or $t'$, so that the feeder will not then be in connection with both sides of the differential receiving instrument.

It will be obvious that by regulating the boosters the resultant potential of the free terminal of said boosters may be either raised or lowered as the circumstances may require in order that said potential may be made the same as that of the feeder terminal, and that in the same manner the electro-motive force of the booster may be varied for the purpose of varying the feeder potential and bringing it to coincidence with that of the switch terminal to which the feeder is to be transferred. When the booster is connected to an intermediate potential as shown in the drawings, it will be obvious that the same may be operated as the source of a supplemental electro-motive force which would tend to lower the initial potential of the bus-bar to which it is connected when a transfer of the feeder is to be made from a bus-bar of one potential to a bus-bar of a lower potential; or in case of transfer from a lower to a higher then the boosters would be operated in the reverse manner.

We do not limit ourselves to any particular means for measuring or comparing the potentials of booster terminal, feeder terminal, and bus-bar switch terminal, as voltmeters and other well known potential indicating equivalents may be employed. As for instance two distinct voltmeters may be used and may be connected respectively as the two sides of the differential galvanometer. In this case the two voltmeters indicate the same potential when the switch is to be moved. We prefer, however, to employ the differential measuring instrument with switches and connections as shown since by this means the switching operation may be more rapidly conducted. It will also be understood that in the place of dynamo boosters such as shown, any source of regulable potential or regulable electro-motive force might be employed without departing from the invention.

While we have described a peculiar construction and arrangement of switch devices adapted to make connections as described, we do not wish to be understood as limiting ourselves to special mechanical constructions and arrangements as many others might be used to produce the same changes of connection as will be well understood by electricians.

By the term "booster" we mean to include any source of electro-motive force which may be interposed in the connection to a feeder in the manner described, and regulated to raise or lower the potential of the feeder terminal in connection with the switching operation or transfer of said feeder from one potential source to another.

In the arrangement thus far described we have assumed that the distinct graded station potentials are obtained from an initial source of potential by means of supplemental electro-motive force generators such as electro-dynamic machines interposed in the connections and acting in series with the initial source so as to raise or lower the potential of said initial source to the requisite point or potential difference on the so-called auxiliary bus-bars.

While it would be possible to obtain the same gradation of potential by continued direct connection to the said auxiliary bus-bars at all times of one or more main dynamos initially adjusted or constructed, nevertheless in many cases this method is objectionable if it be employed under all conditions of station working especially in larger stations where the units of generating capacity are relatively large. During those parts of the day when the load is light the combined output of current from all the bus-bars may be only sufficient to load properly one or two units, whereas, owing to the necessity of using at least one dynamo to each bus-bar to develop and maintain the requisite potential at said bus-bar, this load will be divided among several units all running at light-loads. Moreover, with relatively large units, since the loss in the machinery due to friction and other causes is to a great extent independent of the load, it follows that the efficiency, (or the ratio of the useful to the total energy developed,) will be very small at light loads. This is particularly true of dynamos directly coupled to compound engines, wherein the engine friction when running light may absorb a large proportion of the total power developed by the engine. By the use of "boosters" or supplemental generators, counter or assisting, in the manner hereinabove described, to develop the auxiliary bus-bar potentials, the whole load can be concentrated into two units for the ordinary three wire systems, one for each side of the neutral bus-bar.

In the modification we now proceed to describe, the objections just mentioned are overcome entirely and the use of dynamos connected directly to the auxiliary bus-bars is made a feature of great utility and convenience, as well as economy in the operation of a central station. This is accomplished by employing for the auxiliary bus-bars, boosters and dynamos, together or singly as the circumstances may determine, and as we proceed to explain.

Instead of making the boosters of such construction that they can carry the whole current load supplied from the auxiliary bus-bars, we now make them of smaller current capacity, such for instance, as would be equal to about three quarters or seven eighths of the current carrying capacity of the armature of one of the station dynamos. If several units or sizes of dynamos are used this rating of the booster capacity is made with reference to the smallest unit. Although the efficiency of these dynamos is very low at light loads, it rises toward its normal point at loads of three quarters or seven eighths of normal capacity. There is, it is evident, a critical capacity or load for each dynamo, at which the efficiency loss, from all sources will balance the losses caused by the boosters, either by the heating of their resistance or the friction of their bearings. At this point it evidently makes no difference, so far as economy is concerned, whether we use a booster or a dynamo for producing the auxiliary bus-bar potential. In order to utilize this circumstance we arrange the circuits in such a way that any dynamo can be connected onto any bus-bar. In Fig. 3, we show an arrangement of switch apparatus for this purpose where each dynamo connects to a dynamo bus, from which the connection may be made to any of the feeder bus-bars, by means of devices which we symbolize in the diagram in the form of plug connections 10, 10, 10.

The booster system is arranged as in the previous figures, suitable provision being made for connecting and disconnecting them from the bus-bars as for instance by a plug switch.

In the operation of the system, so long as the load is too light to make it economical or expedient to employ separate dynamos for the auxiliary bus-bars, the auxiliary bus-bars receive their current from the main bus-bars, through the booster armature in passing through which the potential is suitably raised or lowered. When the load reaches a point where the auxiliary bus-bars have to carry more load than the booster can carry, a separate dynamo is started and after being brought to the proper potential, is switched directly onto said auxiliary bus-bar, thereby relieving the booster, which may now be entirely disconnected. If the load should further increase until the separate dynamo feeding the auxiliary bus, is fully loaded, the booster can again be connected so as to take part of the load and when the load has sufficiently increased to load both the dynamo and booster, another separate dynamo can be connected to the auxiliary bus. Thus the booster serves as a means of carrying loads which could not be economically carried by the dynamos direct; and on the other hand, by thus combining the two factors (dynamo and boosters), the initial capacity and cost of both is minimized.

As will be obvious the gradations of potential of the main dynamos might be secured not by regulation but by providing dynamos whose primary capacity unadjusted should be different; but as the differences of potential are not very great the range of adjustment of machines of the same primary or rated capacity may be depended upon to give the required differences of potential upon said bus-bars.

We have in the foregoing described one way that may be used for regulating the potential of a feeder terminal, such way consisting essentially in the use of a regulable source of electro-motive force, but we do not wish to be understood as limiting ourselves to the use of such a device, and it is well known to electricians that the electric potential of a conductor or a switch or contact terminal connected thereto may be varied or adjusted in other ways.

It will be obvious that, without departing from our invention, other generators of electric energy might be used in place of the main dynamo generators supplying the bus-bars and also that other generators of electro-motive force counter or assisting might be used in place of the motor or dynamo armatures of machines C, C′, C², C³.

What we claim as our invention is—

1. The combination, substantially as described, of a series of bus-bars of graded potentials, a series of feeders or sets of feeders, switches for shifting said feeders at pleasure from one bus bar to another, a source of variable electro-motive force, and means for varying the same while connected to a feeder before transfer of said feeder from one bus-bar to another.

2. The combination, substantially as described, of a series of bus-bars of graded potentials, a series of feeders or sets of feeders, switches for shifting said feeders from one bus-bar to another at pleasure, an electro-motive force generator, means for varying the electro-motive force of said generator to cause the feeder terminal to assume the potential of a bar to which it is to be transferred, means for connecting said generator to a feeder or set of feeders while the latter is connected to a bus-bar, and means for disconnecting said generator after the transfer.

3. The combination, substantially as described, of a series of bus-bars of graded potentials, a series of feeders or sets of feeders, switches for transferring said feeders from one bus-bar to another according to their load, and means for connecting a source of variable or adjustable electro-motive force to a feeder before transfer of the latter from one bus-bar to another and disconnecting it after transfer.

4. The combination, substantially as described, of a series of bus-bars or terminals of electrical supply of graded potentials, a series of feeders or sets of feeders, switches for transferring said feeders from one terminal to another according to their load, means for connecting a source of adjustable electro-motive force to a feeder terminal while connected to a terminal of graded potential, and means for disconnecting said source after its terminal has been brought to the potential of the terminal to which the transfer of the feeder is to be made and the transfer has been effected.

5. In a system of electrical supply, the combination with a series of feeders or sets of feeders, of a number of sources of different or graded potentials, switches for shifting said feeders at pleasure from one bus bar or source to another, and means for gradually raising or lowering the potential of any feeder terminal independently of other feeders or sets of feeders to bring it to the potential of the bar or source to which it is to be shifted.

6. The combination, substantially as described, of a series of bus-bars of different or graded potential, a series of feeders, switches for transferring said feeders from one bus-bar to another, a regulable supplemental source of electro-motive force, and means for connecting the same to any feeder for the transfer operation, as and for the purpose described.

7. The combination, substantially as described, of a series of bus-bars of graded potentials, a series of feeders or sets of feeders, switches for transferring said feeders from one bus-bar to another, a regulable source of electro-motive force connected at one terminal to an intermediate potential and provided at its other with means for connecting it to any feeder for the transfer operation as described, and means for reversing the operation of the supplemental source to permit it to oppose or aid the said intermediate potential.

8. The combination, substantially as described, of a series of bus-bars, a series of feeders or sets of feeders, switches for transferring said feeders from one bus-bar to another at pleasure, a supplemental electro-motive force generator having means for connecting it to said feeders, a differential measuring instrument, and means for connecting the two sides thereof to said supplemental generator and to any feeder simultaneously, as and for the purpose described.

9. The combination, substantially as described, of a bus-bar or bars supplied with a given potential from any source, additional bus-bars having supplemental electro-motive force generators between them and the first named bars, feeders having switches for transferring them from one bus-bar to another, a supplemental regulable source connected at one terminal to one of said bus-bars, and means for connecting the other end to a feeder, as and for the purpose described.

10. The combination, substantially as described, of a series of bus-bars, a series of feeders or sets of feeders, switches for transferring said feeders from one bus bar to another, a regulable electro-motive force generator with means for connecting a free terminal thereof to any feeder during the switching operation, a differential measuring instrument, and means for connecting the two sides thereof respectively to the said regulable generator and connected feeder terminal and to the switch terminal of the bus-bar to which it is desired to transfer said feeder.

11. The combination, substantially as described, of a number of sources of different or graded potential, a feeder, a switch for shifting said feeder at pleasure from one source to another, a path or circuit independent of that which connects the feeder with one of said sources directly, means for connecting the feeder to said independent path or circuit while said feeder remains connected directly to said source, and a potential regulating device in said independent path for varying the potential at the terminal thereof, which connects to a feeder terminal.

12. The herein described method of switching a feeder from a source of one potential to another, consisting in first connecting said feeder to a regulable source whose potential at the feeder terminal is the same as that of the source to which it is first connected, disconnecting the first source, varying the regulable source until the potential of the feeder terminal is changed to that of the source to which it is to be shifted, and then switching to the latter.

13. The herein described method of shifting a feeder from a source of one potential to a source of another potential, consisting in first measuring the potential of said feeder at the switch terminal and adjusting a source of regulable or variable electro-motive force until the potential at a terminal thereof is the same as that of the feeder switch terminal, then connecting the terminal of said source to the feeder and disconnecting the feeder from its original source, adjusting the regulable source until the feeder terminal assumes the potential of the source to which it is to be connected, making the connection while the said regulable source remains connected, and finally disconnecting the latter.

14. The combination, substantially as described, of a series of bus-bars, a bank of main generators with means for connecting and disconnecting them from said bars, and an auxiliary or supplemental generator or generators of less capacity provided with means for placing them in a series circuit between the main generator supplying one bus-bar and another bus-bar.

15. The combination, substantially as described, of a series of bus-bars of normally different or graded potentials, a bank of main generators with means for connecting and disconnecting them severally to and from said bus-bars, and auxiliary electro-motive force generators coupled together and run part as assisting and part as counter electro-motive force generators in separate connections between a main generator or generators and bus-bars of different potential.

16. The combination, substantially as described, of two or more main dynamos, two bus-bars, means for connecting and disconnecting said dynamos at pleasure from said bus-bars, and an auxiliary dynamo armature of smaller capacity than the main dynamo and run either as a source of counter or assisting electro-motive force in a series connection between one of said bus-bars and the main source of energy by which the other bus-bar is supplied direct.

17. The combination, substantially as described, of a series of bus-bars, a series of main dynamos, switches for connecting the dynamos to the bus-bars as the load of the latter may vary, auxiliary electro-motive force generators of smaller capacity than the main dynamos run between the bus-bars in series connection between a bar and a main dynamo supplying another bus-bar, and switches for making and breaking the latter connections at pleasure.

18. The combination with the bus-bars, of different normal potentials, of dynamo machines adapted to supply the required different potentials directly, switches for connecting and disconnecting said machines from said bus-bars, auxiliary armatures run in connections between bus-bars, and means for making and breaking said connections, as and for the purpose described.

19. The combination with bus-bars of graded potentials, of main generators adapted to supply the required different potentials direct, auxiliary regulable generators of electro-motive force counter or direct, and means for connecting and disconnecting said auxiliary generators into circuits between said main generators and bus-bars.

20. The combination with bus-bars of graded potentials, of main dynamo generators and auxiliary dynamo armatures in connections between the bus-bars and run some as assisting and some as counter electro-motive force generators and suitable switches and connections for the several machines whereby the said bus-bars may be supplied with the different graded potentials, either by a main dynamo or dynamos supplemented by an auxiliary generator or generators or by main dynamos alone running at the proper relative potentials.

21. The combination with a series of bus-bars of different or graded potentials, of supplemental or auxiliary electro-motive force generators in series connections between said bus-bars and main generators of any desired adjustable or primary potential capacity, and switches controlling the connections of said generators and bus-bars as and for the purpose described, whereby the said graded potentials may be had according to the loading of the station either from a uniform main potential source supplemented as described or from a main generator alone when the load becomes great.

22. In an electric light and power central station, the combination with two bus-bars of the same sign, of an auxiliary generator of electro motive force counter or assisting in a direct connection from one bus bar to the other, and operating in a series connection between one bus-bar and the source supplying another bus-bar direct.

23. The combination with the main station bus-bar, of the auxiliary bus-bars of higher and lower potential respectively, feeders connecting the said bus-bars to consumption circuits, and auxiliary dynamo armatures connected between the main and auxiliary bars and run part as motors and part as generators, in series with the source supplying the main station bus-bar.

24. The combination, in a central station, of two or more main generators, a supplemental or auxiliary generator, two bus-bars supplied respectively by a main generator or generators directly and by a main generator working through a supplemental generator, and means for disconnecting the supplemental generator from the latter bus-bar when the load increases to a predetermined amount and connecting a main generator direct thereto.

25. The combination, substantially as described, of a bus-bar or bars of any desired potential and forming a source of energy from which electric light or power circuits are fed, a generator or generators supplying to said bus-bar or bars a definite or determined potential direct, an auxiliary bus-bar for feeding electric light or power circuits at a different potential, an auxiliary generator in the connection between said auxiliary bus-bar and a source of energy of the potential at which the first named bus-bar or bars are run, said auxiliary generator being of an electro-motive force counter or assisting equivalent to the difference in potential between the said main and auxiliary bus-bars, a number of feeders, and suitable switches for connecting the same at pleasure to said bus-bars.

26. The herein described method of shifting a feeder terminal from a bus-bar of one potential to a bus-bar of lower potential, consisting in gradually lowering the potential of the feeder terminal itself while maintaining the connection of said feeder with the bus-bar of higher potential, shifting the feeder to the bus-bar of lower potential, and then breaking its connection with the bus-bar of higher potential.

Signed at New York, in the county of New York and State of New York, this 25th day of April, A. D. 1893.

CYPRIEN O. MAILLOUX.
WILLIAM S. BARSTOW.

Witnesses:
WM. H. CAPEL,
THOS. F. CONREY.